(12) United States Patent
Johnson et al.

(10) Patent No.: US 6,193,240 B1
(45) Date of Patent: Feb. 27, 2001

(54) SEAL ASSEMBLY

(75) Inventors: Roger Neal Johnson, Hagaman; William David Longfritz, Fonda, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/227,867

(22) Filed: Jan. 11, 1999

(51) Int. Cl.$^7$ ........................................ F01D 5/06
(52) U.S. Cl. .................... 277/643; 277/644; 415/135; 415/138
(58) Field of Search ...................... 277/643, 644, 277/648, 634, 637, 940; 415/135, 139, 138, 113

(56) References Cited

U.S. PATENT DOCUMENTS

| | | | |
|---|---|---|---|
| 4,537,024 | * | 8/1985 | Grosjean ............................ 415/139 |
| 5,158,430 | * | 10/1992 | Dixon et al. ........................ 415/139 |
| 5,249,920 | | 10/1993 | Shepherd et al. . |
| 5,577,472 | * | 11/1996 | Banta . |
| 5,865,600 | * | 2/1999 | Mori et al. ........................... 415/135 |

* cited by examiner

Primary Examiner—Anthony Knight
Assistant Examiner—Enoch E. Peavey
(74) Attorney, Agent, or Firm—Noreen C. Johnson; Douglas E. Stoner

(57) ABSTRACT

A seal assembly that seals a gap formed by a groove comprises a seal body, a biasing element, and a connection that connects the seal body to the biasing element to form the seal assembly. The seal assembly further comprises a concave-shaped center section and convex-shaped contact portions at each end of the seal body. The biasing element is formed from an elastic material and comprises a convex-shaped center section and concave-shaped biasing zones that are opposed to the convex-shaped contact portions. The biasing element is adapted to be compressed to change a width of the seal assembly from a first width to a second width that is smaller than the first width. In the compressed state, the seal assembly can be disposed in the groove. After release of the compressing force, the seal assembly expands. The contact portions will move toward a surface of the groove and the biasing zones will move into contact with another surface of the groove. The biasing zones will bias the contact portions of the seal body against the surface of the groove.

25 Claims, 1 Drawing Sheet

SEAL ASSEMBLY

The government has rights in this invention pursuant to Contract No. DEAC21-87-MC23170 awarded by the Department of Energy.

BACKGROUND OF THE INVENTION

The invention relates to static seal structures. In particular, the invention relates to static seals for turbines, such as gas and steam turbines.

Seals are used between nozzle segments in turbines, engines, and other similar devices to prevent fluid flow between the segments. One known static seal assembly 101 for a nozzle segment is illustrated in FIG. 1. The seal assembly 101 comprises a metallic seal 100, which is an essentially flat, un-curved piece of metal. The metallic seal 100 defines generally flat, contact regions 104. The metallic seal 100 fits into grooves 102 in nozzle segments 103. The metallic seal 100 bridges a gap 105 formed by the grooves 102 and seals against the nozzle segments 103 at the contact regions 104. Thus, the seal assembly 101 reduces leakage at the grooves 102.

The above-described seal assembly 101 reduces leakage, however these seal assemblies depend on differential pressure to seal at the contact regions 104. The differential pressure is applied across the metallic seal 100 in direction 120 to force the contact regions 104 against the nozzle segments 103. The differential pressure maintains the contact regions 104 against the nozzle segments 103. The differential pressure against the metallic seal 100 may not always be sufficient for maintaining sealing pressure. Thus, these prior art seal assemblies may result in an inadequate seal.

Further, the differential pressure may vary due to operation of the turbine. Thus, the contact region 104 may not be forced with sufficient sealing pressure to be positioned and form a seal against the nozzle segments 103. The lack of sufficient sealing pressure is further apparent when the nozzle segments 103 move with respect to each other. The movement may result from one nozzle segment moving direction 103, regardless of the movement's cause. The generally flat, contact regions 104 do not move and may not remain in contact with the nozzle segments due to their flat configuration. Accordingly, the prior art metallic seal 100 may not exhibit an adequate seal against the nozzle segments 103.

Therefore, a static seal assembly that provides for enhanced sealing pressure is desirable. Additionally, a seal assembly that provides enhanced sealing pressure, regardless of differential pressure across it, is needed.

SUMMARY OF THE INVENTION

An exemplary embodiment of the invention provides a seal assembly that is adapted to be inserted into a groove to seal a gap formed by the groove. The seal assembly comprises a seal body, a biasing element, and a connection that connects the seal body to the biasing element to form the seal assembly. The seal assembly further comprises a concave-shaped center section and convex-shaped contact portions at each end of the seal body. The biasing element is formed from an elastic material and comprises a convex-shaped center section and concave-shaped biasing zones at each end of the biasing element that are opposed to the convex-shaped contact portions. The biasing element is adapted to be compressed to change a width of the seal assembly from a first width to a second width that is smaller than the first width. In the compressed state, the seal assembly can be disposed in the groove. After release of the compressing force, the seal assembly expands. The contact portions will move toward a surface of the groove and the biasing zones will move into contact with another surface of the groove. The biasing zones will bias the contact portions of the seal body against the surface of the groove to seal against the surface.

These and other aspects, advantages and salient features of the invention will become apparent from the following detailed description, which, when taken in conjunction with the annexed drawings, where like parts are designated by like reference characters throughout the drawings, disclose embodiments of the invention.

DESCRIPTION OF THE INVENTION

A static seal assembly 1, as embodied by the invention, comprises a seal body 10 and at least one biasing element 12. The seal body 10 is formed of a material having high strength and oxidation resistance properties at high temperatures. These high temperatures include operational temperatures encountered in engine and turbine applications. Exemplary static seal assembly materials, within the scope of the invention, include superalloy materials. Superalloy materials are typically used in engine and turbine applications and exhibit high stress and oxidation resistance at elevated temperatures. These superalloy materials include, but are not limited to, nickel-based superalloys, iron-based superalloys, cobalt-based superalloys, and nickel-iron based superalloys. Alternatively, the seal body 10 can comprise a metal body coated, for example a superalloy body with a coating. The coating can comprise a metal, such as a superalloy. The superalloy that forms the coating may be the same superalloy that forms the seal body. Further, the seal body 10 may comprise a first superalloy material and the coating may comprise a second superalloy material that is different from the first superalloy material.

Figure 2:
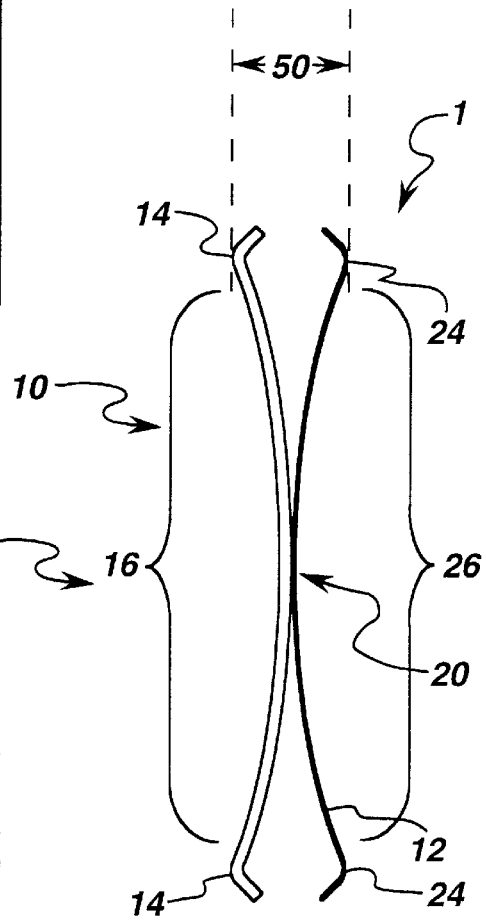
FIG. 2 is a side-sectional, schematic illustration of a seal assembly.
Figure 3:
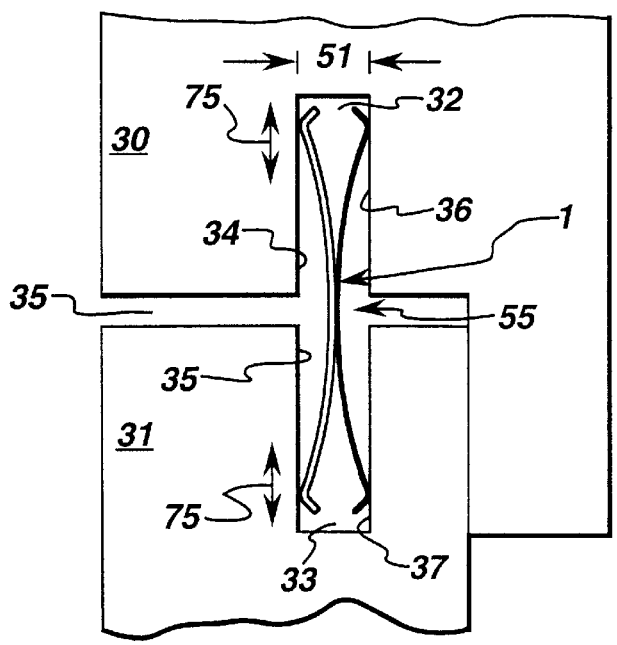
FIG. 3 is a side-sectional, schematic illustration of a seal assembly in its sealing position.

As illustrated in FIGS. 2 and 3, the seal body 10 comprises a strip 11 of elastic metallic material. The strip 11 of elastic metallic material comprises two arc-shaped contact portions 14 (hereinafter "contact portions") at each end of the seal body 10. The contact portions 14 are convex-shaped, as viewed in direction 15, which is generally opposed to differential pressure (to be described hereinafter). The contact portions 14 are formed by any appropriate metallurgical forming process, including but not limited to, hammer forging, bending, drawing, pressing, and roll forming, and combinations thereof.

The seal body 10 is also configured to comprise a center section 16, which is disposed between the contact portions 14. The center section 16 comprises a concave-shaped section, as viewed in direction 15. The concave-shaped center section 16 extends to each contact portion 14, which comprise convex portions, when viewed in the direction 15. The center section 16 is formed by any appropriate metallurgical forming process, including but not limited to, hammer forging, bending, drawing, pressing, and roll forming, and combinations thereof. The scope of the invention comprises the contact portions 14 and center section 16 formed by any appropriate metallurgical forming process.

The biasing element 12 comprises an elastic metallic material, which maintains its elasticity at high temperatures. Materials for the biasing element 12 comprise superalloy materials. The biasing element 12 comprises a thin, spring-like element (often referred to in the art as a "leaf spring"). The biasing element 12, as illustrated in FIGS. 2 and 3, comprises two arc-shaped biasing zones 24 (hereinafter "biasing zones") at each end of the biasing element 12. The biasing zones 24 are opposed to the contact portions 14 of the seal body 10. The biasing zones 24 are concave-shaped, as viewed in direction 15. The biasing zones 24 are formed by any appropriate metallurgical process, including but not limited to, hammer forging, bending, drawing, pressing, and roll forming, and combinations thereof.

The biasing element 12 is also configured to comprise a center section 26, which is disposed between the biasing zones 24. The center section 26 extends to each biasing zones 24. The center section 26 defines convex portion, as viewed in direction 15. The center section 26 is formed by any appropriate metallurgical process, including but not limited to, hammer forging, bending, drawing, pressing, and roll forming, and combinations thereof. The scope of the invention comprises the biasing zones 24 formed by any appropriate metallurgical process.

The biasing element 12 is attached to the seal body 10 at a connection 20. The connection 20 comprises any appropriate metallurgical connection, such as a connection that is selected from the group comprising welds, brazes, rivets, screws, bolts, and other mechanical connections. The center section 26 of the biasing element 12 and the center section 16 of the seal body 10 are joined to each other by the connection 20. Thus, the static seal assembly 1 comprises a single-piece, integral, static seal assembly 1. The connection 20 should maintain its integrity at high temperatures, such as operational temperatures developed in turbine and engine applications. For example, if the connection 20 comprises a weld, the weld comprises electrical resistance welds, arc welds, cold welds, electron beam welds, laser beam welds, solid state welds, explosion welds, ultrasonic welds, and combinations thereof.

In use, the static seal assembly 1 is adapted to be inserted by being compressed and inserted into a gap 35 to seal the gap 35 in nozzles segments 30 and 31. The static seal assembly 1 forms a seal therein across the gap 35, and reduces leakage at the gap 35. The gap 35 is formed by grooves 32 and 33 in nozzle segments 30 and 31, respectively. The grooves 32 and 33 define sealing surfaces 34 and 35, respectively, where the contact portions 14 of seal body 10 make sealing contact. The grooves 32 and 33 also define abutting surfaces 36 and 37. The biasing zones 24 of biasing element 12 contact the abutting surfaces 36 and 37, respectively. The description of a nozzle application is merely exemplary of applications of the static seal assembly 1, and is not meant to limit the invention in any way. For example, the static seal assembly may be used in other high temperature applications, including, but not limited to, power generation devices, engines, and other applications in which high operational temperatures are encountered.

The biasing element 12 is pre-loaded. "Pre-loaded" means that the width 50 of the static seal assembly 1 (FIG. 2) before it is positioned in the grooves 32 and 33 is greater than its width 51 (FIG. 3) after it is in sealing position in the grooves 32 and 33. In order to load the static seal assembly 1 into the grooves 32 and 33, the biasing element 12 and seal body 10 are forced toward each other against the inherent elasticity of the seal body 10 and the biasing element 12. This forcing together of the biasing element 12 and seal body 10 compresses the static seal assembly 1. The static seal assembly 1 is compressed until its width is smaller than the width of the grooves 32 and 33. In this compressed state, the seal assembly 1 can be positioned in the grooves 32 and 33.

Figure 1:
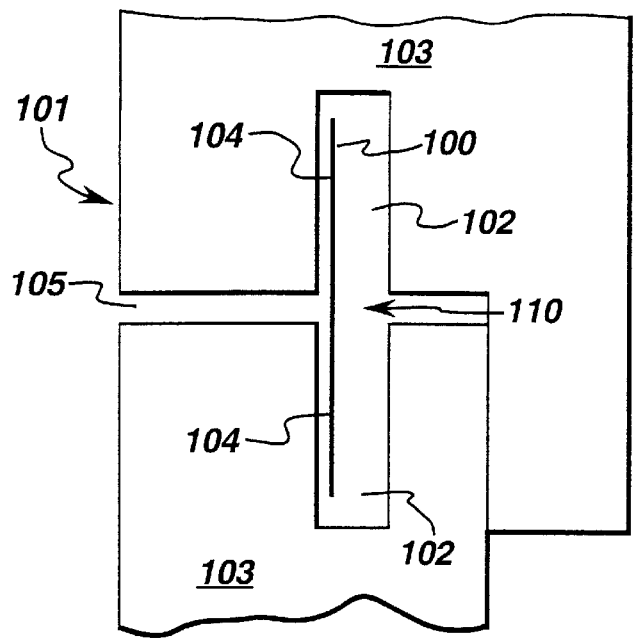
FIG. 1 is a side-sectional, schematic illustration of a prior art seal assembly.

When the compressing force is removed, the static seal assembly 1 expands to width 51 and seals the gap 35. The biasing zones 24 of the biasing element 12 contact the abutting surfaces 36 and 37. The biasing element 12 can not expand against the abutting surfaces 36 and 37 any further, and thus forces the contact portions 14 of the seal body 10 against the sealing surfaces 34 and 35 of the nozzle segments 31 and 33. A contact pressure is applied by the contact surfaces 14 against the sealing surfaces 34 and 35. The contact pressure is independent of one or both of differential pressure in the gap 35 and pressure across the static seal assembly 1. Of course, differential pressure can further the sealing function of the static seal assembly 1 by applying a pressure in direction 55 (FIG. 3). Therefore, the seal assembly 1 does solely not rely on differential pressure for sealing, contrary to the seal of FIG. 1.

The contact portions 14 of the seal body 10 comprise curved sealing surfaces. These curved sealing surfaces are acruate and adapted for sliding, if needed, in direction 75 (FIG. 3) on the sealing surfaces 34 and 35 of the grooves 32 and 33, respectively. Accordingly, any motion in direction 75 of one or both of the static seal assembly 1 and the sealing surfaces 34 and 35 will not result in a loss of sealing contact. The sliding ability of the static seal assembly with respect to the sealing surfaces 34 and 35 reduces build up of forces, such as stresses, on the static seal assembly 1. The reduced build up of forces reduces wear on the static seal assembly 1, prolongs the life of the static seal assembly 1, and maintain the static seal assembly's sealing ability. These beneficial effects are especially evident at the high temperatures and stresses encountered in turbine and engine applications. The motion can be caused by movement of the parts, either intentional as during operation or motion that occurs as a result of thermal expansion.

The length, thickness, and degree of curvature in the convex and concave portions of each seal body 10 and the biasing element 12 can be varied. This variance permits the static seal assembly 1 to fit into and seal in gaps of many sizes. The biased, elastic nature of the static seal assembly 1, as embodied by the invention, provides an essentially constant, sealing pressure, regardless of differential pressure.

While various embodiments are described herein, it will be appreciated from the specification that various combinations of elements, variations or improvements therein may be made by those skilled in the art, and are within the scope of the invention.

We claim:

1. A seal assembly for sealing a gap formed by a groove, the seal assembly is adapted to be inserted into the groove and contact a sealing surface and an abutting surface of the groove, the seal assembly comprising:

a seal body comprising a concave-shaped center section and convex-shaped contact portions at each end of the seal body, the contact portions of the seal body comprise arcuate, curved sealing surfaces, the curved sealing surfaces adapted for sliding contact on a surface of the groove;

a biasing element formed from an elastic material, the biasing element comprises a convex-shaped center section and concave-shaped biasing zones that are opposed to the convex-shaped contact portions; and a connection that connects the center section of the seal body to the center section of the biasing element to form the seal assembly, with said seal body and biasing element being separated from each other at opposite ends thereof;

wherein the seal assembly is adapted to be inserted into a groove to seal in the groove.

2. A seal assembly according to claim 1, wherein for the seal assembly to be inserted into a groove to seal in the groove, the biasing element is compressed to change a width of the seal assembly from a first width to a second width that is smaller than the first width so the seal assembly can be disposed in the groove, the seal assembly expanding after being compressed so the contact portions move toward a sealing surface of the groove and the biasing zones move into contact with an abutting surface of the groove, in which the biasing zones bias the contact portions of the seal body against the sealing surface of the groove.

3. A seal assembly according to claim 1, wherein the seal body comprises a superalloy material.

4. A seal assembly according to claim 1, wherein the biasing element comprises a superalloy material.

5. A seal assembly according to claim 1, wherein the seal body and biasing element comprise a superalloy material.

6. A seal assembly according to claim 1, wherein the connection is selected from welds, brazes, rivets, screws, bolts, and mechanical connections.

7. A seal assembly according to claim 6, wherein the weld comprises one of an electrical resistance, an arc weld, a cold weld, an electron beam, a laser beam, a solid state weld, an explosion weld, an ultrasonic weld, and combinations thereof.

8. A seal assembly according to claim 1, wherein the seal assembly is formed by at least one of hammer forging,, bending, drawing, pressing, and roll forming, and combinations thereof.

9. A seal assembly according to claim 1, wherein the biasing element is formed by at least one of hammer forging, bending, drawing, pressing, and roll forming, and combinations thereof.

10. A seal assembly according to claim 1, wherein the groove is disposed between nozzle segments of an engine and turbine.

11. A seal assembly according to claim 1, wherein at least one of the seal body and biasing element comprises a superalloy material, the superalloy material selected from the group consisting of: nickel-based superalloy materials, iron-based superalloy materials, cobalt-based superalloy materials, iron-nickel-based superalloy materials, and combinations thereof.

12. A seal assembly for sealing a gap formed by a groove, the seal assembly adapted to be inserted into the groove, the seal assembly contacting a sealing surface and an abutting surface of the groove, the seal assembly comprising:

means for sealing comprising a concave-shaped center section and convex-shaped contact portions at each end of the means for sealing, the contact portions of the means for sealing comprise arcuate, curved sealing surfaces, the curved sealing surfaces adapted for sliding contact on a surface of the groove;

means for biasing, the means for biasing being formed from an elastic material, the means for biasing comprises a convex-shaped center section and concave-shaped biasing zones that are opposed to the convex-shaped contact portions, the convex-shaped center section of the means for biasing being connected to the concave-shaped center section of the means for sealing to form the seal assembly; and means for connecting the center section of the means for sealing to the center section of the means for biasing to form the seal assembly, with said sealing means and biasing means being separated from each other at opposite ends thereof.

13. A seal assembly according to claim 12, wherein the means for sealing comprises a superalloy material.

14. A seal assembly according to claim 12, wherein he means for biasing comprises a superalloy material.

15. A seal assembly according to claim 12, wherein the means for sealing and means for biasing comprise a superalloy material.

16. A seal assembly according to claim 12, wherein the connecting means is selected from welds, rivets, brazes, screws, bolts, and mechanical connections.

17. A seal assembly according to claim 16, wherein the weld comprises one of an electrical resistance, an arc weld, a cold weld, an electron beam, a laser beam, a solid state weld, an explosion weld, an ultrasonic weld, and combinations thereof.

18. A seal assembly according to claim 12, wherein the means for sealing is formed by at least one of hammer forging, bending, drawing, pressing, and roll forming, and combinations thereof.

19. A seal assembly according to claim 12, wherein the means for biasing is formed by at least one of hammer forging, bending, drawing, pressing, and roll forming, and combinations thereof.

20. A seal assembly according to claim 12, wherein the means for sealing and the means for biasing are formed by at least one of hammer forging, bending, drawing, pressing, and roll forming, and combinations thereof.

21. A seal assembly according to claim 12, wherein the groove is disposed between nozzle segments of an engine and turbine.

22. A seal assembly according to claim 12, wherein at least one of the means for sealing and the means for biasing comprises a superalloy material, the superalloy material selected from the group consisting of: nickel-based superalloy materials, iron-based superalloy materials, cobalt-based superalloy materials, iron-nickel-based superalloy materials, and combinations thereof.

23. A seal assembly according to claim 12, wherein the means for biasing is adapted to be compressed to change a width of the seal assembly from a first width to a second width that is smaller than the first width, so the seal assembly can be disposed in the groove, the seal assembly expanding so the contact portions move toward a sealing surface of the groove and the biasing zones move into contact with an abutting surface of the groove, in which the biasing zones bias the contact portions of the seal body against the sealing surface of the groove.

24. A turbine nozzle seal comprising:

a seal body including a center section and corresponding contact portions at opposite ends thereof;

a leaf spring including a center section and corresponding contact portions at opposite ends thereof;

said contact portions of said body and spring being outwardly arcuate oppositely to each other at said opposite ends of said body and spring; and said body being fixedly joined to said spring only at said center sections thereof, and being separated from each other at said opposite ends thereof for differential elastic movement therebetween.

25. A seal according to claim 24 wherein said body contact portions protrude outwardly from said center section thereof, and said spring contact portions protrude outwardly from said center section thereof.

* * * * *